United States Patent
Shaji et al.

(10) Patent No.: US 10,410,108 B2
(45) Date of Patent: Sep. 10, 2019

(54) SYSTEMS, METHODS, AND COMPUTER PROGRAM PRODUCTS FOR SEARCHING AND SORTING IMAGES BY AESTHETIC QUALITY PERSONALIZED TO USERS OR SEGMENTS

(71) Applicant: EyeEm Mobile GmbH, Berlin (DE)

(72) Inventors: Appu Shaji, Berlin (DE); Ramzi Rizk, Berlin (DE); Gökhan Yildirim, Berlin (DE)

(*) Notice: Subject to any disclaimer, the term of this patent is extended or adjusted under 35 U.S.C. 154(b) by 38 days.

(21) Appl. No.: 15/670,453

(22) Filed: Aug. 7, 2017

(65) Prior Publication Data
US 2018/0039879 A1 Feb. 8, 2018

Related U.S. Application Data

(60) Provisional application No. 62/372,181, filed on Aug. 8, 2016.

(51) Int. Cl.
| | |
|---|---|
| G06K 9/62 | (2006.01) |
| G06N 3/02 | (2006.01) |
| G06K 9/46 | (2006.01) |
| G06F 16/583 | (2019.01) |
| G06K 9/03 | (2006.01) |
| G06N 3/04 | (2006.01) |
| G06N 3/08 | (2006.01) |

(52) U.S. Cl.
CPC ........... *G06N 3/02* (2013.01); *G06F 16/5838* (2019.01); *G06K 9/036* (2013.01); *G06K 9/46* (2013.01); *G06K 9/6228* (2013.01); *G06K 9/6267* (2013.01); *G06K 9/6271* (2013.01); *G06N 3/0454* (2013.01); *G06N 3/082* (2013.01)

(58) Field of Classification Search
CPC .... G06F 17/30256; G06K 9/036; G06K 9/46; G06K 9/6228; G06K 9/6267; G06K 9/6271; G06N 3/02
See application file for complete search history.

(56) References Cited

U.S. PATENT DOCUMENTS 6,816,847 B1 * 11/2004 Toyama ............... G06K 9/00
382/156
8,712,157 B2 * 4/2014 Marchesotti ......... G06N 99/005
358/504

(Continued)

*Primary Examiner* — Bhavesh M Mehta
*Assistant Examiner* — Ian L Lemieux
(74) *Attorney, Agent, or Firm* — Rothwell, Figg, Ernst & Manbeck, P.C.

(57) ABSTRACT

A method for assigning a personalized aesthetic score to an image is provided. The method includes providing a base neural network for generating learned features. The base neural network is trained on a first set of training images and the base neural network includes two or more layers comprising one or more initial layers and one or more final layers. The method further includes receiving a second set of training images and updating the base neural network to generate a personalized neural network based on the received second set of training images. Updating the base neural network comprises re-training the final layers of the base neural network with the second set of images and keeping the initial layers of the base neural network, such that the personalized neural network includes two or more layers comprising one or more initial layers and one or more final layers.

20 Claims, 7 Drawing Sheets

(56) References Cited

U.S. PATENT DOCUMENTS

| | | | | |
|---|---|---|---|---|
| 8,755,596 B2* | 6/2014 | Datta | .................. | G06K 9/00624 |
| | | | | 382/160 |
| 2015/0055854 A1* | 2/2015 | Marchesotti | ........... | G06K 9/627 |
| | | | | 382/159 |
| 2016/0098844 A1* | 4/2016 | Shaji | ....................... | G06T 9/002 |
| | | | | 382/156 |
| 2016/0140408 A1* | 5/2016 | Shen | .................... | G06K 9/4676 |
| | | | | 382/157 |
| 2016/0148078 A1* | 5/2016 | Shen | ........................ | G06K 9/66 |
| | | | | 382/158 |
| 2017/0294010 A1* | 10/2017 | Shen | ..................... | G06T 7/0002 |

* cited by examiner

SYSTEMS, METHODS, AND COMPUTER PROGRAM PRODUCTS FOR SEARCHING AND SORTING IMAGES BY AESTHETIC QUALITY PERSONALIZED TO USERS OR SEGMENTS

CROSS REFERENCE TO RELATED APPLICATION(S)

This application claims priority to U.S. Provisional Application Ser. No. 62/372,181, entitled "SYSTEMS, METHODS, AND COMPUTER PROGRAM PRODUCTS FOR SEARCHING AND SORTING IMAGES BY AESTHETIC QUALITY PERSONALIZED TO USERS OR SEGMENTS," filed Aug. 8, 2016, which is incorporated herein by reference in its entirety.

U.S. application Ser. No. 14/726,172, entitled "SYSTEMS, METHODS, AND COMPUTER PROGRAM PRODUCTS FOR SEARCHING AND SORTING IMAGES BY AESTHETIC QUALITY", filed May 29, 2015, is incorporated herein by reference in its entirety.

U.S. application Ser. No. 14/506,103, entitled "SYSTEMS, METHODS, AND COMPUTER PROGRAM PRODUCTS FOR SEARCHING AND SORTING IMAGES BY AESTHETIC QUALITY", filed Oct. 3, 2014, is incorporated herein by reference in its entirety.

U.S. application Ser. No. 14/506,097, now U.S. Pat. No. 9,280,565, filed Oct. 3, 2014, is incorporated herein by reference in its entirety.

TECHNICAL FIELD

The present invention relates generally to systems, methods, and computer program products for enabling users to better manage, sort, search, display, and view images. More particularly, the present invention relates to assigning an aesthetic score to an image based on aesthetic quality that is personalized to one or more users or segments.

BACKGROUND OF THE INVENTION

Existing systems for learning-to-rank algorithms are difficult to apply to images. Because text documents contain substantially less data than images and are much more structured (e.g. syntax, semantics, document-level structure) than image data, special care and attention must be taken to ensure that the dimensions of feature vectors used to train a machine-learned model are reasonable. Existing systems cannot simply be converted to apply to image features based on aesthetic quality.

The systems or methods that do exist for assigning an aesthetic score to an image suffer from several drawbacks, including poor performance and being limited to classification rather than ranking. These systems fail to assign an aesthetic score that correlates to intuitive notions of aesthetic quality. The use of such systems to order images by aesthetic quality or to search images by aesthetic quality is inadequate.

With over a trillion photographs being taken every year, many of which are in digital format as images on the Internet, it is a growing problem to be able to manage, sort, search, display, and view such images based on aesthetic quality. Thus there is a need for a system, method, and computer program product that assigns an aesthetic score to an image based on aesthetic quality, and that allows for sets of images to be ordered and searched based on aesthetic quality.

However, aesthetics is subjective. It can vary from person to person and also various firms uses different styles of aesthetics in different use cases. Thus there is need for a system, method, and computer program product that assigns an aesthetic score learned from the previous usage or specified based on examples, that can be adapted for different users, groups of users, demographic groups, segments, usage patterns, and the like.

SUMMARY OF THE INVENTION

Accordingly, systems, methods, and computer program products addressing the above-described problems are described herein.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
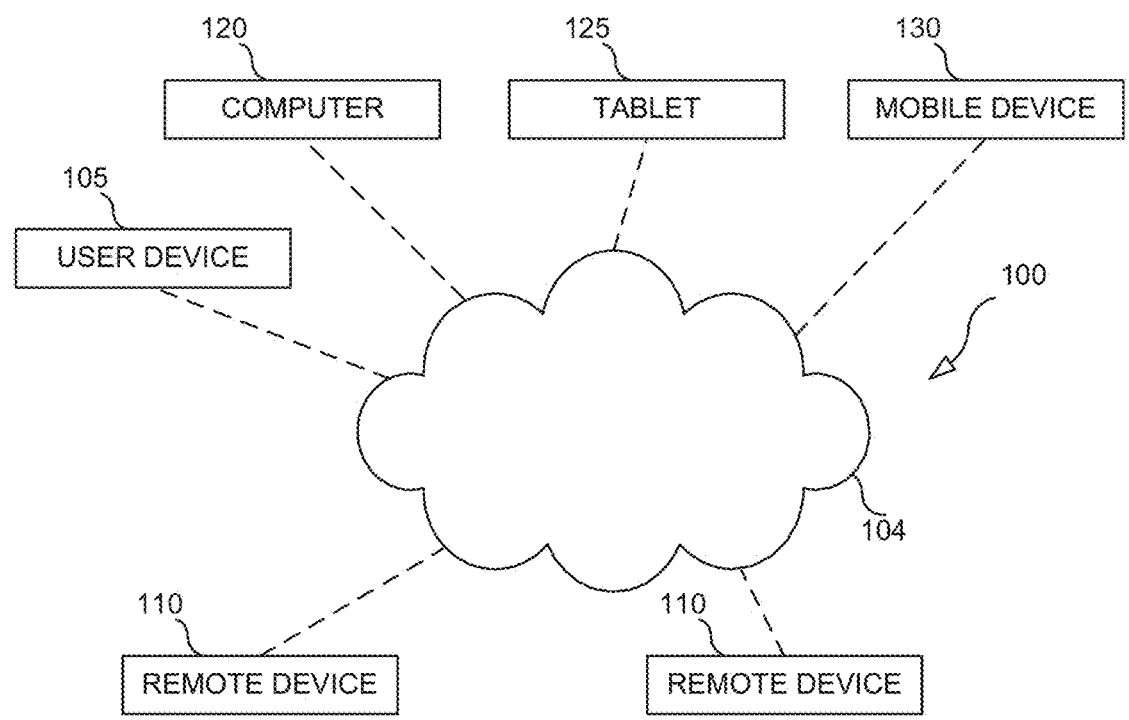
FIG. 1 illustrates an architecture of a communications system according to exemplary embodiments.

As described in the above-referenced U.S. application Ser. No. 14/726,172, a neural network may be trained and subsequently used to generate learned features from an image. Such a neural network may, in some embodiments, be a deep neural network, and the learned features may be deep-learnt features. As also explained, in certain embodiments, the learned features include outputs of one or more layers of the neural network. For example, layers at different depths of the neural network may provide features representing different levels of information.

In accordance with some embodiments, additional features are extracted from the image, such as manually-selected features.

These features, including those derived from the neural network and any other features, are then fed into a machine-learned model that is applied to assign an aesthetic score to an image, wherein a more aesthetically-pleasing image is given a higher aesthetic score and a less aesthetically-pleasing image is given a lower aesthetic score. In some embodiments, the features form a vector of high-dimensional encoded features that is reduced by applying a machine-learned projection matrix to keep the distance between pairs of aesthetic images and non-aesthetic images large and pairs of similar images (e.g. both aesthetic or both non-aesthetic) small. In certain embodiments the machine-learned projection matrix is learned using a WSABIE algorithm.

In one embodiment, the assigning of an aesthetic score to an image may be personalized, e.g., to a particular user, group of users, demographic group(s), segment(s), usage pattern(s), and the like. Such personalization depends on having additional data.

In one embodiment, the additional data for personalization may come from user input. For example, a user may be shown a number of images, and may select images that the user prefers. In some embodiments, the user may additionally, or in the alternative, select images that the user does not prefer. Thus, for a given screen of images shown to the user, the system may then determine one or more of the following sets: the set of images the user prefers, the set of images the user does not prefer, and the set of images the user has not made a selection for. In some embodiments, the user may then be shown additional screens of images to further select data for personalization. In some embodiments, those additional images may be selected based on the user's prior selection of preferences.

In some embodiments, a model may be adapted by learning a unique (personalized) machine-learned projection matrix (such as the embodiment using the WSABIE algorithm) for different users or use cases.

In accordance with some embodiments, where a more fine grained personalization is desired than was provided by the original training set, one or more of the final layers of the neural network may be updated, rather than having to update the entire model.

Further, in some embodiments, the personalization layer (or layers) (i.e., those layers that are updated based on the personalized data set) may be comprised of a linear and/or non-linear multi dimensionality reduction functions. WSABIE is an instance of linear multi-dimensionality reduction functions. In some embodiments, these functions can be trained quickly using stochastic gradient methods.

In some embodiments, the personalization layer (or layers) may be comprised of a smaller neural network. The smaller neural network may, for example, comprise dense matrix multiplications, convolution layers, and/or non-linear operations (e.g., sigmoid, tanh, and rectified linear unit functions).

During stochastic gradient methods, the computation of the gradient can be adapted and weighed, based on past knowledge bases. This allows a certain style (personalization) of aesthetics to be enforced.

In some embodiments, a non-linear multi-dimensionality function can be learned by minimizing a non-linear cost function that ensure features in the low-dimensional feature space remain as close as possible, if they are close to each other in the high-dimensional feature space.

These non-linear functions can be learned from data by minimizing the cost function in the latent feature space, by minimizing the cost function that computes the violation of the above specified rule (i.e., penalize the case when distances between features in the low-dimensional feature space are large but the corresponding distances in the high-dimensional feature space are small). In certain embodiments, the non-linear functions may be learned by using a small neural network, and in other embodiments, by using a Gaussian process.

In some embodiments, the learning of a projection matrix (e.g., using the WSABIE algorithm) can be done in near real time. This enable users to see the result of their personalization, and provide additional input—for example, to enable further personalization. The additional input can be of form: "we need to see more images of this certain aesthetics"; "we do not see more images of a certain aesthetics"; or "we prefer to see an image of particular aesthetics over another" (i.e., prioritization of aesthetic style).

In some embodiments, multiple different personalization styles may be provided, and they can be trained together (e.g., by ensuring unique and distinct personalization for each of the personalization styles). In some embodiments, different personalization styles may be treated as multiple classes, and each class may be distinguished by using a multi-class classifier. In some embodiments, a personalization layer can receive as input, the output of a multi-label, multi-class classifier, which can be learned to extract the different classes (e.g., classes such as cat, dog, beauty in nature, serenity, and so on). In some embodiments, a personalization layer can receive as input, additional metadata (e.g., such as time, location, camera settings in which the photo was captured).

In some embodiments, the features of the base network for a given set of image can be pre-computed. This may be then given as input to an already-trained model. In such a scenario, for re-scoring a given set of images, only the computations in the personalization layer need to be performed after it is trained. In some embodiments, the training of a personalization layer may be performed on Graphical Processing Units (GPUs), and in embodiments, computations of rescoring a trained personalized layer can be performed on GPUs.

In some embodiments, the training of a personalization layer for 100 images may take less than a second. In some embodiments, personalized aesthetics may be computed in less than a second, using a trained personalized layer for more than half-a-million photos whose features have been precomputed.

In some embodiments, the training of the personalized layer might be done in mobile device, smartphone, or other low-powered portable device. In some embodiments, the personalized layers can be transmitted over the wire/network to a new device, where the personalized layers can be used.

In some embodiments, a GUI interface is provided for the user to specify images of his/her choice. The interface is smart in the sense that, in some embodiments, when a user specifies a set of images, the interface may recommend more images based on the models trained so far—that is, the next candidate images shown to the user may become more relevant based on the user's feedback. Thus, each selection enables users to narrow down his/her personal aesthetics, and collect candidate images faster and better.

In some embodiments, if a user demands higher quality, the full network can be retrained.

As also described in the above-referenced U.S. application Ser. No. 14/726,172, a method for searching images by aesthetic quality may be provided. In these embodiments, the method comprises receiving a search query. The method further comprises searching a plurality of images based on the search query, whereby a list of search results is generated. The method further comprises displaying the list of search results by the method for ranking images by aesthetic quality for display. In some embodiments, the searching a plurality of images comprises searching a plurality of metadata associated with the plurality of images.

In some embodiments, a method for searching images by aesthetic quality may be personalized or specialized to the visual style of a particular user, group of users, demographic group(s), segment(s), usage pattern(s), and the like. In one embodiment, the search may be personalized or specialized to a specific organization.

For example, a user may be a company or brand who has previously formulated a brand identity. In some embodiments, the aesthetic algorithm may be trained from scratch based on the formulated brand identity. In other embodiments, personalization of the algorithm may be based on previously collected images that are representative of the formulated brand identity.

In some embodiments, brands or users can measure the engagement its visual content is receiving from its audience (e.g., number of views, likes, comments, or other such metrics). Using this data, an aesthetic algorithm can be personalized to best serve the audience and maximize engagement.

By prioritizing content based on previous data collected by photo editors and image curators, the manual work can be reduced by suggesting pictures from the database that fits the photo editors' or image curators' style.

Personalized search can have many different applications.

A social network user/manager can maximize social engagement of his/her content by using personalized aesthetics that is fitting to his/her audience.

A market place where visuals are used to advertise, or for product placement, can increase its review by making personalized suggestions to various users, such as by recommending the content that fits the aesthetic style of each user. The data for training such algorithms can come from the user's previous activity in a platform (e.g., number of interactions, the time a user stays on a given page ("dwell time")), or the user's providing such data by a GUI.

A advertiser who uses visuals/images to advertise, can select the images personalized to his/her audience.

A presentation of a set of photographs, which corresponds to a particular aesthetics can be created. This can be exposed in publications, real-life exhibitions, virtual reality areas, and the like.

A market place where visuals are used to advertise, or a social network which uses visuals to convey a story, can route a different segment of users to a personalized set of photographs.

A market place can use personalized layers to search and identify the highly influential photographers (a/k/a tastemakers) that fits the personalization adequate for various brands and products they are trying to sell.

Photo curators in various agencies select images based on various aesthetic criteria. A personalization layer can be trained to mimic these criteria. Often, such criteria do not have an explicit description, and depends on local knowledge of a particular curator. Once properly trained, the personalization layer can automatically pick and select images to assist the human curators. In some instances, the curation can be performed without having supervision of a human curator at all.

Referring to FIGS. 1-7B, exemplary methods, systems, and computer program products for searching and sorting images by aesthetic quality personalized to users or segments are provided.

Referring now to FIG. 1, an exemplary architecture of a communication system in accordance with embodiments of the present invention is illustrated. System 100 includes at least one remote device 110 that is configured to communicate with one or more user devices 105 through a communications network 104 (e.g., the internet). Examples of user devices include a computer 120 (e.g., laptop or desktop), a tablet 125 (e.g., an iPad), and a mobile device 130 (e.g., a smartphone, such as, for an example, an iPhone). An example of a remote device 110 includes a server. The system, method and computer program product of the present invention can, for example, be deployed as a user/client-server implementation, as an ASP model, or as a standalone application running on a user device 105.

The user device 105 can be configured to communicate with one or more remote devices 110 via the network 104. Remote devices 110 are configured to generate, maintain, and host the computer program product in one embodiment. The remote devices 110 generate, maintain and host web pages (e.g., HTML documents) that embody the present invention. The remote devices 110 include services associated with rendering dynamic web pages, such as data storage services, security services, etc. Accordingly, remote devices 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Remote devices 110 may be coupled with a data storage facility, which may include one or more local or remote memory systems or units, and can include one or more databases and/or file systems for storing data, media, graphics, HTML documents, XML documents, etc.

Remote devices 110 can be configured to include an admin function, which enables an administrator to perform system-related functions. The system-related functions can include maintaining user records, performing upgrades on the software and topic content, and the moderation of tasks.

Figure 2:
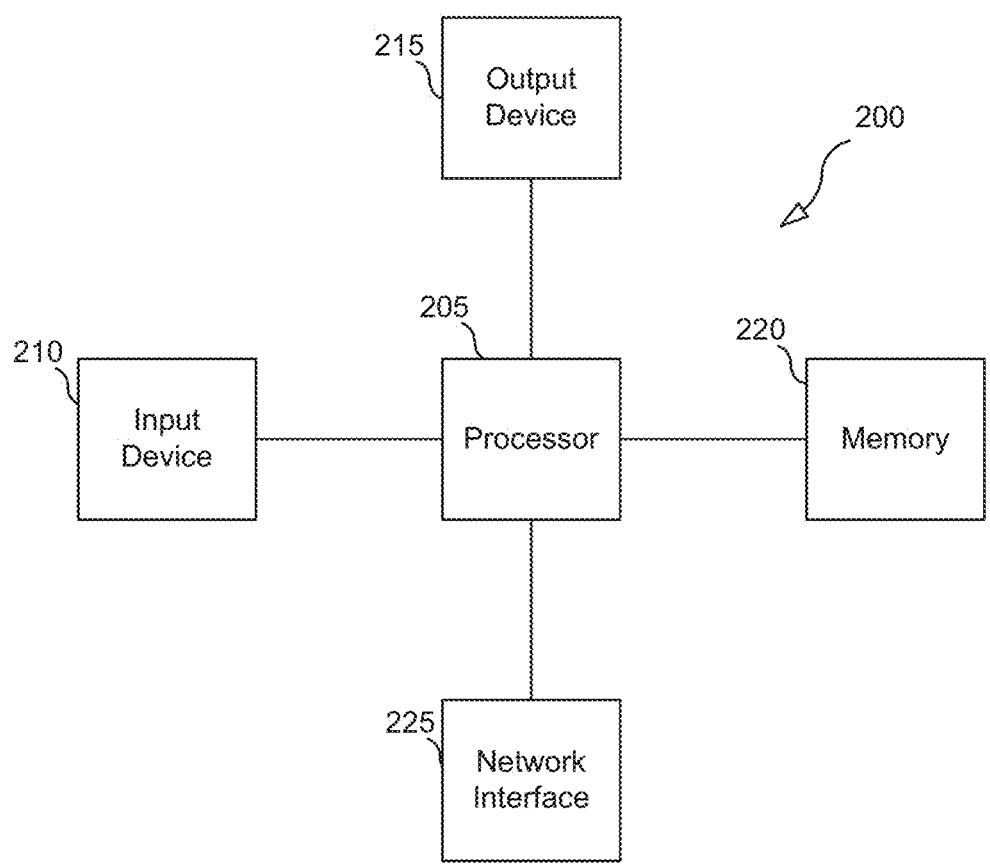
FIG. 2 illustrates a block diagram of a device according to exemplary embodiments.

Referring to FIG. 2, a block diagram of a device 200, such as for example, user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
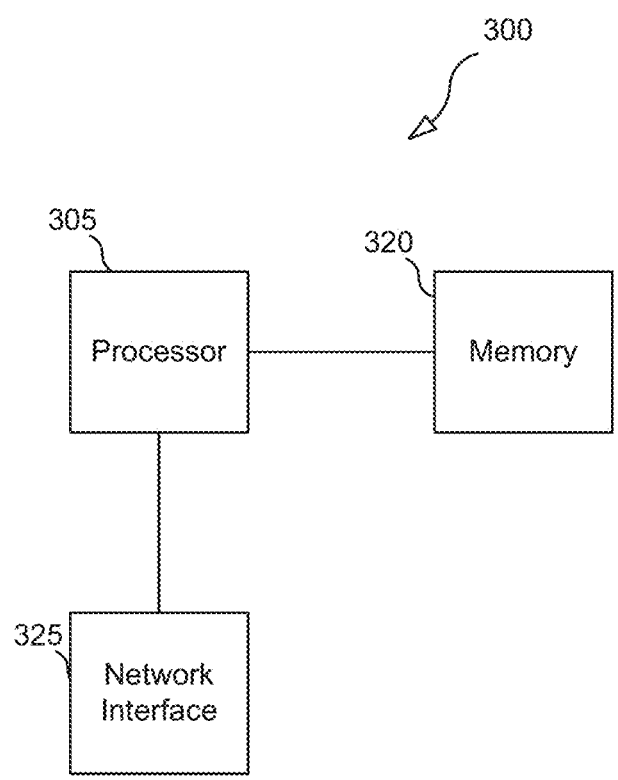
FIG. 3 illustrates a block diagram of a remote device according to exemplary embodiments.

Referring now to FIG. 3, a block diagram of a remote device in accordance with exemplary embodiments of the present invention is illustrated. As shown in FIG. 3, the remote device 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305. Processor 305 controls the operation of network interface 315 and memory 310 and the flow of data and functionality between them. In various embodiments inputs can come from the device 200, to the remote device 300, via the network interface 315. Processing can occur at the remote device 300, at the device 200, or at both. In various embodiments, remote device 300 may be a server.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where remote device 300 includes a microprocessor, computer readable program code may be stored in a computer readable medium, such as, but not limited to magnetic media (e.g., a hard disk), optical media (e.g., a DVD), memory devices (e.g., random access memory, flash memory), etc. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

Figure 4:
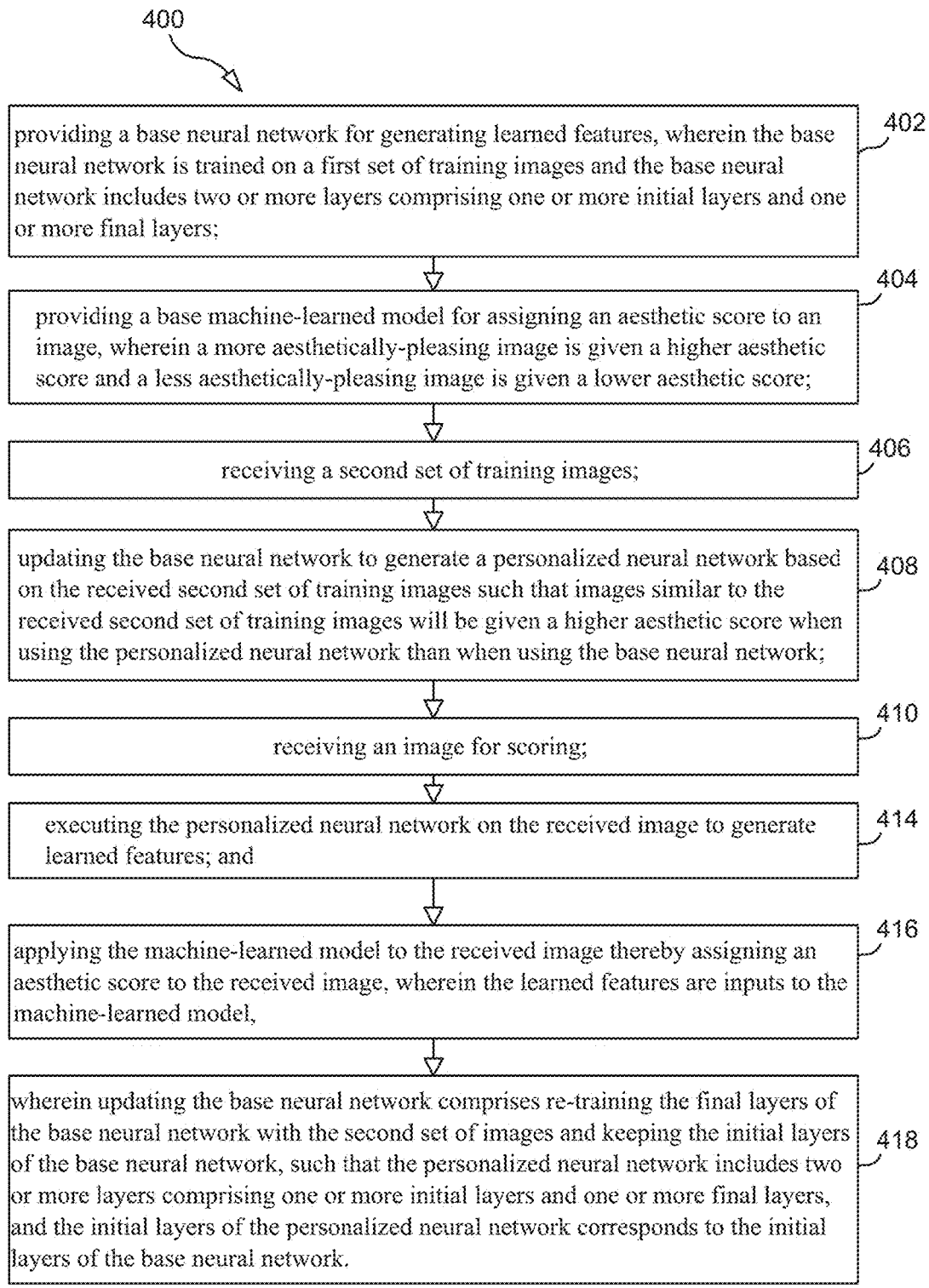
FIG. 4 illustrates a flow chart for a process according to exemplary embodiments.

FIG. 4 is a flow diagram illustrating steps of an exemplary method 400 for assigning a personalized aesthetic score to an image.

In an embodiment of the present invention, method 400 includes providing a base neural network for generating learned features (step 402). The base neural network is trained on a first set of training images and the base neural network includes two or more layers comprising one or more initial layers and one or more final layers.

In an embodiment, a 3-layer multi-layer perceptron neural network with ReLU non-linearities and batch normalization within the layers may be used.

The method further includes providing a base machine-learned model for assigning an aesthetic score to an image (step 404). A more aesthetically-pleasing image is given a higher aesthetic score and a less aesthetically-pleasing image is given a lower aesthetic score.

The method further includes receiving a second set of training images (step 406). Training images may come, for example, from a user (e.g., as prompted by a graphical user interface, such as described below in relation to FIG. 6). As another example, training images may come from known information about a user (or segment), such as, for example, recently visited or most visited images, "likes," or other data that may be collected for a given user (or segment) indicative of a user's (or segment's) aesthetic preference.

The method further includes updating the base neural network to generate a personalized neural network based on the received second set of training images such that images similar to the received second set of training images will be given a higher aesthetic score when using the personalized neural network than when using the base neural network (step 408).

The method further includes receiving an image for scoring (step 410).

The method further includes executing the personalized neural network on the received image to generate learned features (step 412).

The method further includes applying the machine-learned model to the received image thereby assigning an aesthetic score to the received image (step 416). The learned features are inputs to the machine-learned model.

Updating the base neural network comprises re-training the final layers of the base neural network with the second set of images and keeping the initial layers of the base neural network, such that the personalized neural network includes two or more layers comprising one or more initial layers and one or more final layers, and the initial layers of the personalized neural network corresponds to the initial layers of the base neural network (step 418).

According to some embodiments, the final layers of the personalized neural network comprise linear and/or non-linear multi-dimensionality reduction functions, and may, in some embodiments, be trained using stochastic gradient methods, where a computation of a gradient is adapted and weighted based on past knowledge bases. For example, the output of a keywording model along with various ontologies which describe the relationship between various keywording may be comprise a past knowledge base. In embodiments, this can be supplemented with various EXIF information.

According to some embodiments, the final layers of the personalized neural network comprise non-linear multi-dimensionality reduction functions, and the non-linear multi-dimensionality reduction functions are learned from data by minimizing a cost function in a latent feature space. In some embodiments, when the final layers of the personalized neural network comprise non-linear multi-dimensionality reduction functions, the non-linear multi-dimensionality reduction functions may be learned by using a small neural network or by using a Gaussian process. For example, as described above, a 3-layer multi-layer perceptron neural network with ReLU non-linearities and batch normalization within the layers may be used. In some embodiments, the linear and/or non-linear multi-dimensionality reduction functions are learned in near real-time.

According to some embodiments, the method may further include receiving a third set of training images. For example, a user may desire subsequent refinement of the personalized model (e.g., after viewing additional images based on the personalized model); the personalization may also be iterative, such that as a user is providing images for personalization, the model is updated, and additional images are provided based on the updated model. The method may also further include updating the personalized neural network to generate a second personalized neural network based on the received third set of images such that images similar to the received third set of images will be given a higher aesthetic score when using the second personalized neural network than when using the personalized neural network. The method may further include receiving a second image for scoring; executing the personalized neural network on the received second image to generate second learned features; and applying the machine-learned model to the received second image thereby assigning a second aesthetic score to the received second image, where the learned second features are inputs to the machine-learned model. Updating the personalized neural network comprises re-training the final layers of the personalized neural network with the third set of images and keeping the initial layers of the personalized neural network, such that the second personalized neural network includes two or more layers comprising one or more initial layers and one or more final layers, and the initial layers of the second personalized neural network corresponds to the initial layers of the personalized neural network.

According to some embodiments, receiving the second set of training images comprises providing a graphical user interface (GUI) to a user comprising one or more candidate images; and receiving input from the user indicating one or more of: (i) that the user prefers an image of the one or more candidate images; (ii) that the user dislikes an image of the one or more candidate images; and (iii) that the user prefers one image over another image of the one or more candidate images. According to some embodiments, the method further includes, after updating the base neural network, providing a second GUI to a user comprising one or more second candidate images, the one or more second candidate images being selected based on the personalized neural network. The method may also further include receiving second input from the user indicating one or more of: (i) that the user prefers an image of the one or more second candidate images; (ii) that the user dislikes an image of the one or more second candidate images; and (iii) that the user prefers one image over another image of the one or more second candidate images. The method may also further include generating a third set of training images based on the received second input and updating the personalized neural network to generate a second personalized neural network based on the received third set of images such that images similar to the received third set of images will be given a higher aesthetic score when using the second personalized neural network than when using the personalized neural network; receiving a second image for scoring. The method may further include executing the personalized neural network on the received second image to generate second learned features; and applying the machine-learned model to the received second image thereby assigning a second aesthetic score to the received second image, where the learned second features are inputs to the machine-learned model. Updating the personalized neural network comprises re-training the final layers of the personalized neural network with the third set of images and keeping the initial layers of the personalized neural network, such that the second personalized neural network includes two or more layers comprising one or more initial layers and one or more final layers, and the initial layers of the second personalized neural network corresponds to the initial layers of the personalized neural network.

Figure 5:
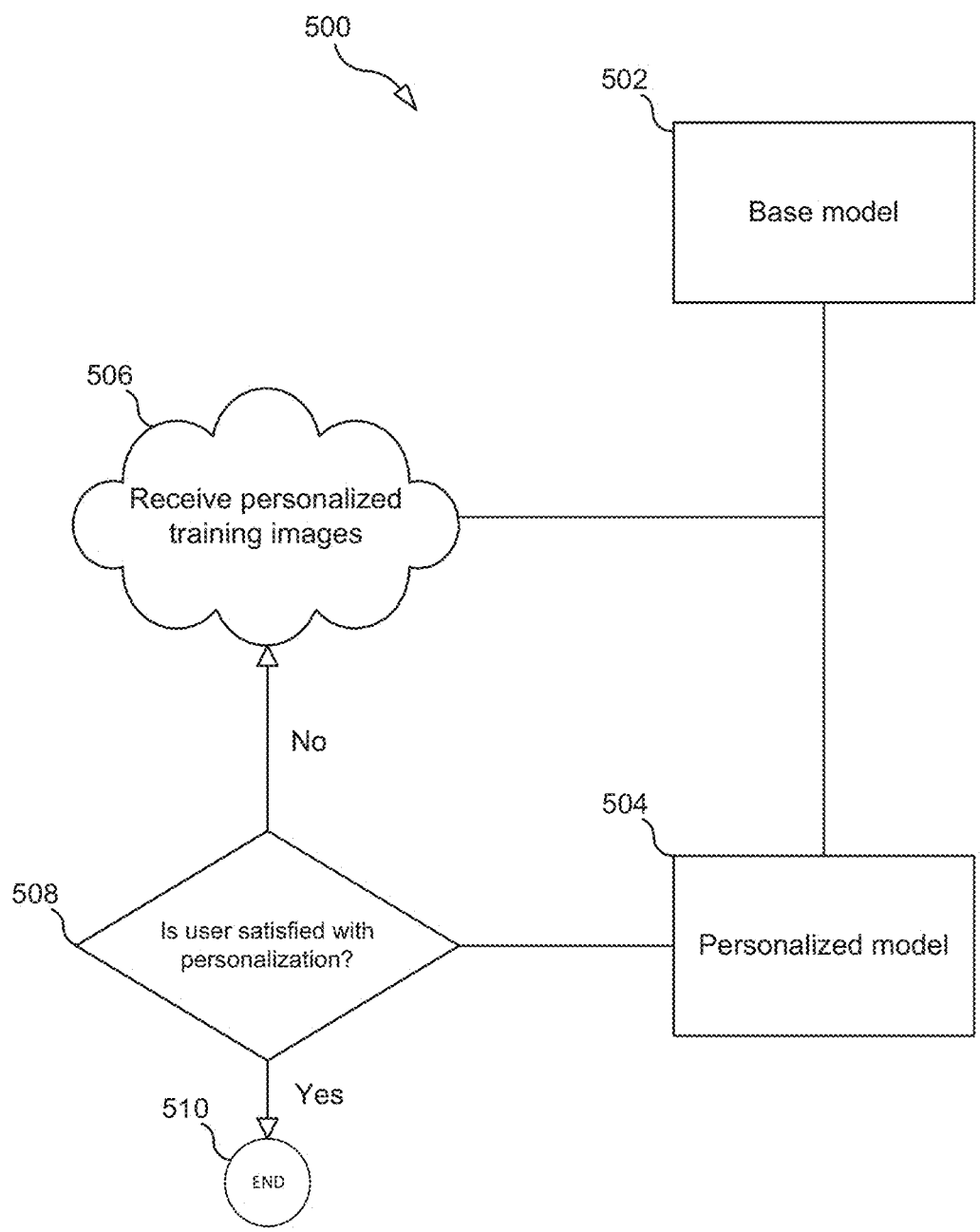
FIG. 5 illustrates a block diagram for a system according to exemplary embodiments.

FIG. 5 is a block diagram illustrating a system according to exemplary embodiments. System 500 includes a base model 502. System 500 receives personalized training images (e.g., images indicative of a particular user's or segment's aesthetic preferences, for example by a GUI as described elsewhere in this disclosure) at 506. With this personalized training images, base model 502 is updated (e.g., to reflect the aesthetic preferences indicated by the personalized training images) to produce a personalized model 504. If an indication from a user that the user is satisfied with the personalization is received at 508, then the system reaches an equilibrium point 510. Otherwise, if there is an indication from the user that the user is not satisfied, system 500 continues to receive personalized training images at 506 to further refine and update the personalized model 504.

Figure 6:
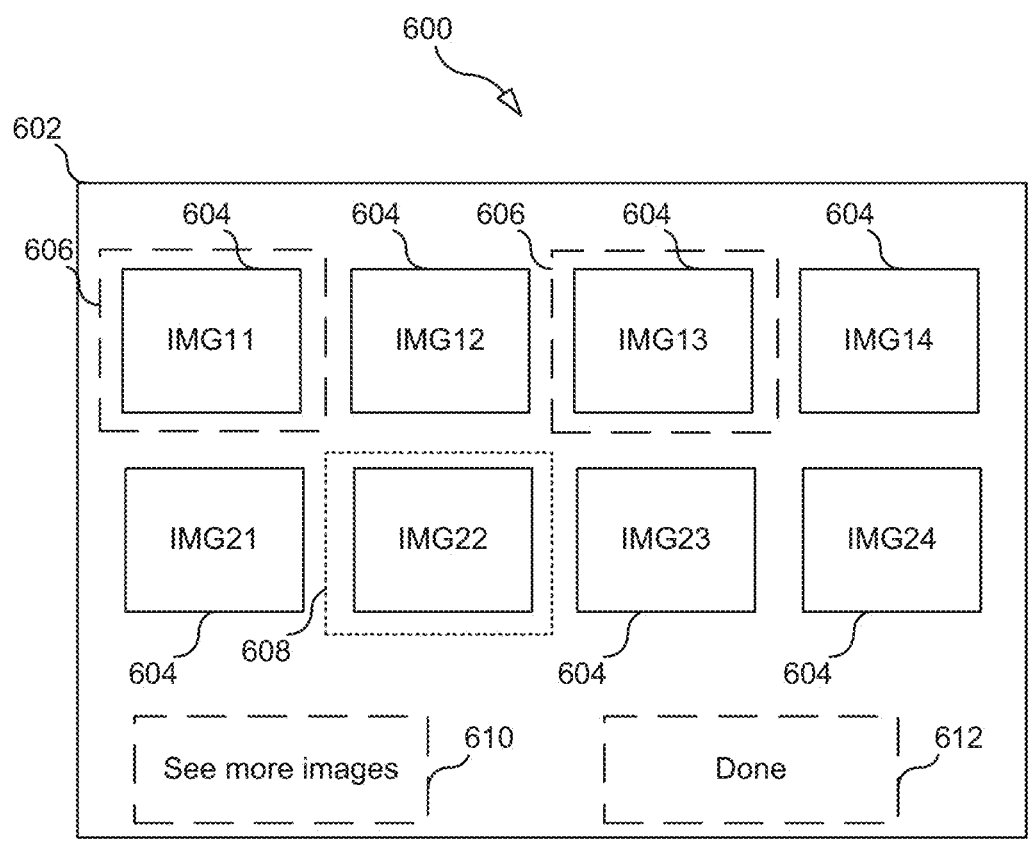
FIG. 6 illustrates a graphical user interface (GUI) according to exemplary embodiments.

FIG. 6 illustrates an exemplary graphical user interface (GUI) 600 according to exemplary embodiments. The GUI 600 may include a display 602 including one or more images 604. In one embodiment (as shown), images 604 may be arranged by row and column in a grid, but images 604 may also be presented in other suitable ways. GUI 600 provides a mechanism to allow a user to indicate a preference (e.g., by clicking, by keyboard, or by other input mechanisms). For example, the user may indicate that the user prefers the image (e.g., wants to see more images having similar aesthetic properties). These images are indicated in FIG. 6 with a dashed-box 606 (long dashes). In some embodiments, display 602 may include a colored-outline around the image, such as a green outline, to indicate this preference. The user may also indicate that the user dislikes the image (e.g., does not want to see more images having similar aesthetic properties). These images are indicated in FIG. 6 with a dashed-box 608 (short dashes). In some embodiments, display 602 may include a colored-outline around the image, such as a red outline, to indicate this preference. The user may indicate that the user has no preference about the image. These images are indicated by the lack of a box surrounding them. In some embodiments, display 602 may include a colored-outline around the image, such as a grey outline, or may include no outline, to indicate this preference.

Display 602 may also include additional information. For example, button 610 allows a user to indicate that the user wants to see more images, so that the user can indicate the user's preference for additional images. The user may decide to do this, for example, to provide additional training data and further personalize the model. When the user selects this button, GUI 602 may transmit the received indications of the user's preferences to a server (possibly a remote server) to update the model. Display 602 may subsequently display additional images 604 that are selected based at least in part on the updated model. As another example, button 612 allows a user to indicate that the user is finished providing the user's preferences. When the user selects this button, GUI 602 may transmit the received indications of the user's preferences to a server (possibly a remote server) to update the model. Display 602 may subsequently display another screen (e.g., a screen the user was looking at before opting to provide additional training data). Other buttons, menus, or other GUI inputs and design elements, are also possible, and may be used.

In some embodiments, a ranking may be generated, and displayed in display 602, that shows a user the best rated images. The user may also receive a confidence score, which indicates the degree of certainty based on the current ranking, and if more data is needed for training. For such embodiments, computing the accuracy of a part of the selected images may be augmented with a large negative set. For example, a curation using the personalization layer in a new set of images may be shown, which may include the negative set of images and a subset of selected image. This curation may then be displayed to a user to show if the top personalized set appears towards the beginning of the curation set.

In embodiments where a processor is included, computer readable program code (CRPC) may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the processor to perform steps described above (e.g., steps described above with reference to the flow charts shown in FIGS. 4 and 5).

Figure 7A:
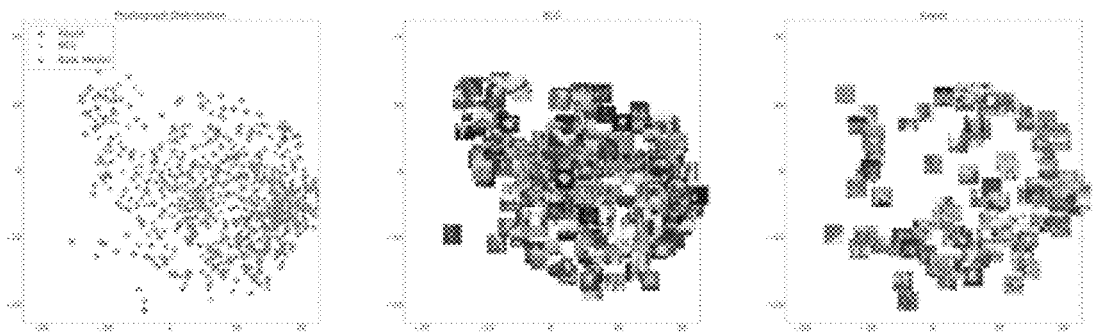
FIG. 7A illustrates a plot of base model features according to exemplary embodiments.
Figure 7B:
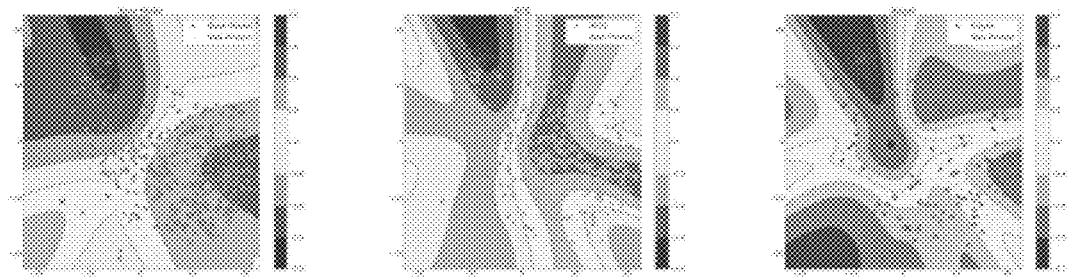
FIG. 7B illustrates a contour plot of rank scores according to exemplary embodiments.

An example is shown in FIGS. 7A-7B. FIG. 7A illustrates a plot of base model features in 2D projection, using t-SNE. The plot includes photographs from three different datasets: the positive training set used to train the example base model, and two independent sets of photographs curated by EyeEm's photo editors while working with BCG and KAYAK. The middle and rightmost figures plot the photographs corresponding to features from BCG and KAYAK samples, respectively. FIG. 7B illustrates contour plots represent the ranking scores of three different models: the base model, the personalized model trained with the BCG photographs, and the personalized model trained with the KAYAK photographs. The scale to the right of each contour plot indicates at the top a higher rank and at the bottom a lower rank, according to the rank assigned to a photograph by the respective model. As can be seen (e.g., comparing the contour plot for the base model and personalized models), the personalization morphs the decision contours (non-linearly) to best fit the distribution of the respective training set.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

We claim:

1. A method for assigning a personalized aesthetic score to an image, comprising:
providing a base neural network for generating learned features, wherein the base neural network is trained on a first set of training images and the base neural network includes two or more layers comprising one or more initial layers and one or more final layers;
providing a base machine-learned model for assigning an aesthetic score to an image, wherein a more aesthetically-pleasing image is given a higher aesthetic score and a less aesthetically-pleasing image is given a lower aesthetic score;
receiving a second set of training images;
updating the base neural network to generate a personalized neural network based on the received second set of training images such that images similar to the received second set of training images will be given a higher aesthetic score when using the personalized neural network than when using the base neural network;
receiving an image for scoring;
executing the personalized neural network on the received image to generate learned features; and
applying the base machine-learned model to the received image thereby assigning an aesthetic score to the received image, wherein the learned features are inputs to the base machine-learned model,
wherein updating the base neural network comprises re-training the final layers of the base neural network with the second set of images and keeping the initial layers of the base neural network, such that the personalized neural network includes two or more layers comprising one or more initial layers and one or more final layers, and the initial layers of the personalized neural network corresponds to the initial layers of the base neural network.

2. The method of claim 1, wherein the final layers of the personalized neural network comprise linear and/or non-linear multi-dimensionality reduction functions.

3. The method of claim 2, wherein the linear and/or non-linear multi-dimensionality reduction functions are trained using stochastic gradient methods, wherein a computation of a gradient is adapted and weighted based on past knowledge bases.

4. The method of claim 2, wherein the final layers of the personalized neural network comprise non-linear multi-dimensionality reduction functions, and the non-linear multi-dimensionality reduction functions are learned from data by minimizing a cost function in a latent feature space.

5. The method of claim 2, wherein the final layers of the personalized neural network comprise non-linear multi-dimensionality reduction functions, and the non-linear multi-dimensionality reduction functions are learned by using a small neural network.

6. The method of claim 2, wherein the final layers of the personalized neural network comprise non-linear multi-dimensionality reduction functions, and the non-linear multi-dimensionality reduction functions are learned by using a Gaussian process.

7. The method of claim 2, wherein the linear and/or non-linear multi-dimensionality reduction functions are learned in near real-time.

8. The method of claim 1, further comprising:
receiving a third set of training images;
updating the personalized neural network to generate a second personalized neural network based on the received third set of images such that images similar to the received third set of images will be given a higher aesthetic score when using the second personalized neural network than when using the personalized neural network;
receiving a second image for scoring;
executing the personalized neural network on the received second image to generate second learned features; and
applying the base machine-learned model to the received second image thereby assigning a second aesthetic score to the received second image, wherein the learned second features are inputs to the base machine-learned model,
wherein updating the personalized neural network comprises re-training the final layers of the personalized neural network with the third set of images and keeping the initial layers of the personalized neural network, such that the second personalized neural network includes two or more layers comprising one or more initial layers and one or more final layers, and the initial layers of the second personalized neural network corresponds to the initial layers of the personalized neural network.

9. The method of claim 1, wherein receiving the second set of training images comprises:
providing a graphical user interface (GUI) to a user comprising one or more candidate images; and
receiving input from the user indicating one or more of: (i) that the user prefers an image of the one or more candidate images; (ii) that the user dislikes an image of the one or more candidate images; and (iii) that the user prefers one image over another image of the one or more candidate images.

10. The method of claim 9, further comprising:
after updating the base neural network, providing a second GUI to a user comprising one or more second candidate images, the one or more second candidate images being selected based on the personalized neural network;
receiving second input from the user indicating one or more of: (i) that the user prefers an image of the one or more second candidate images; (ii) that the user dislikes an image of the one or more second candidate images; and (iii) that the user prefers one image over another image of the one or more second candidate images;
generating a third set of training images based on the received second input;
updating the personalized neural network to generate a second personalized neural network based on the received third set of images such that images similar to the received third set of images will be given a higher aesthetic score when using the second personalized neural network than when using the personalized neural network;
receiving a second image for scoring;
executing the personalized neural network on the received second image to generate second learned features; and
applying the base machine-learned model to the received second image thereby assigning a second aesthetic score to the received second image, wherein the learned second features are inputs to the base machine-learned model,
wherein updating the personalized neural network comprises re-training the final layers of the personalized neural network with the third set of images and keeping the initial layers of the personalized neural network, such that the second personalized neural network includes two or more layers comprising one or more initial layers and one or more final layers, and the initial layers of the second personalized neural network corresponds to the initial layers of the personalized neural network.

11. A device for assigning a personalized aesthetic score to an image, comprising:
a processor; and
a memory coupled to the processor;
wherein the processor is configured to:
provide a base neural network for generating learned features, wherein the base neural network is trained on a first set of training images and the base neural network includes two or more layers comprising one or more initial layers and one or more final layers;
provide a base machine-learned model for assigning an aesthetic score to an image, wherein a more aesthetically-pleasing image is given a higher aesthetic score and a less aesthetically-pleasing image is given a lower aesthetic score;
receive a second set of training images;
update the base neural network to generate a personalized neural network based on the received second set of training images such that images similar to the received second set of training images will be given a higher aesthetic score when using the personalized neural network than when using the base neural network;
receive an image for scoring;
execute the personalized neural network on the received image to generate learned features; and
apply the base machine-learned model to the received image thereby assigning an aesthetic score to the received image, wherein the learned features are inputs to the base machine-learned model,
wherein updating the base neural network comprises re-training the final layers of the base neural network with the second set of images and keeping the initial layers of the base neural network, such that the personalized neural network includes two or more layers comprising one or more initial layers and one or more final layers, and the initial layers of the personalized neural network corresponds to the initial layers of the base neural network.

12. The device of claim 11, wherein the final layers of the personalized neural network comprise linear and/or non-linear multi-dimensionality reduction functions.

13. The device of claim 12, wherein the linear and/or non-linear multi-dimensionality reduction functions are trained using stochastic gradient methods, wherein a computation of a gradient is adapted and weighted based on past knowledge bases.

14. The device of claim 12, wherein the final layers of the personalized neural network comprise non-linear multi-dimensionality reduction functions, and the non-linear multi-dimensionality reduction functions are learned from data by minimizing a cost function in a latent feature space.

15. The device of claim 12, wherein the final layers of the personalized neural network comprise non-linear multi-dimensionality reduction functions, and the non-linear multi-dimensionality reduction functions are learned by using a small neural network.

16. The device of claim 12, wherein the final layers of the personalized neural network comprise non-linear multi-dimensionality reduction functions, and the non-linear multi-dimensionality reduction functions are learned by using a Gaussian process.

17. The device of claim 12, wherein the linear and/or non-linear multi-dimensionality reduction functions are learned in near real-time.

18. The device of claim 11, wherein the processor is further configured to:
receive a third set of training images;
update the personalized neural network to generate a second personalized neural network based on the received third set of images such that images similar to the received third set of images will be given a higher aesthetic score when using the second personalized neural network than when using the personalized neural network;

receive a second image for scoring;

execute the personalized neural network on the received second image to generate second learned features; and apply the base machine-learned model to the received second image thereby assigning a second aesthetic score to the received second image, wherein the learned second features are inputs to the base machine-learned model, wherein updating the personalized neural network comprises re-training the final layers of the personalized neural network with the third set of images and keeping the initial layers of the personalized neural network, such that the second personalized neural network includes two or more layers comprising one or more initial layers and one or more final layers, and the initial layers of the second personalized neural network corresponds to the initial layers of the personalized neural network.

19. The device of claim 11, wherein receiving the second set of training images comprises:

providing a graphical user interface (GUI) to a user comprising one or more candidate images; and receiving input from the user indicating one or more of: (i) that the user prefers an image of the one or more candidate images; (ii) that the user dislikes an image of the one or more candidate images; and (iii) that the user prefers one image over another image of the one or more candidate images.

20. The device of claim 19, wherein the processor is further configured to:

after updating the base neural network, provide a second GUI to a user comprising one or more second candidate images, the one or more second candidate images being selected based on the personalized neural network;

receive second input from the user indicating one or more of: (i) that the user prefers an image of the one or more second candidate images; (ii) that the user dislikes an image of the one or more second candidate images; and (iii) that the user prefers one image over another image of the one or more second candidate images;

generate a third set of training images based on the received second input;

update the personalized neural network to generate a second personalized neural network based on the received third set of images such that images similar to the received third set of images will be given a higher aesthetic score when using the second personalized neural network than when using the personalized neural network;

receive a second image for scoring;

execute the personalized neural network on the received second image to generate second learned features; and apply the base machine-learned model to the received second image thereby assigning a second aesthetic score to the received second image, wherein the learned second features are inputs to the base machine-learned model, wherein updating the personalized neural network comprises re-training the final layers of the personalized neural network with the third set of images and keeping the initial layers of the personalized neural network, such that the second personalized neural network includes two or more layers comprising one or more initial layers and one or more final layers, and the initial layers of the second personalized neural network corresponds to the initial layers of the personalized neural network.

* * * * *